United States Patent

[11] 3,622,132

| [72] | Inventor | Lawrence James Rawlings, Jr. Bridgeview, Ill. |
|---|---|---|
| [21] | Appl. No. | 851,646 |
| [22] | Filed | Aug. 20, 1969 |
| [45] | Patented | Nov. 23, 1971 |
| [73] | Assignee | Chicago Bridge & Iron Company Aurora, Ill. |

[54] SWING-OUT AERATION APPARATUS WITH LOW-FLOW RESISTANCE
3 Claims, 6 Drawing Figs.

[52] U.S. Cl........................................ 261/124, 261/DIG. 47, 285/276
[51] Int. Cl........................................ B01f 3/04
[50] Field of Search........................... 261/DIG. 47, 122, 124; 285/276, 281

[56] References Cited
UNITED STATES PATENTS

| 883,941 | 4/1908 | Egan | 285/276 |
| 2,328,655 | 9/1943 | Lannert | 261/DIG. 47 |
| 2,512,883 | 6/1950 | Warren | 285/276 X |
| 3,174,733 | 3/1965 | Chase | 261/DIG. 47 |
| 3,466,061 | 9/1969 | Bonardi | 285/276 X |

FOREIGN PATENTS

| 108,647 | 2/1924 | Switzerland | 261/DIG. 47 |
| 1,174,520 | 3/1959 | France | 261/DIG. 47 |

Primary Examiner—Tim R. Miles
Attorney—Darbo, Robertson & Vandenburgh

ABSTRACT: Swing-out air-diffuser assembly requiring only simple lift mechanism, and involving low-pressure drop. A preferred embodiment permits virtually infinite angularity of diffuser in its horizontal, operating plane. Useful in connection with sewage treatment systems.

INVENTOR:
LAWRENCE JAMES RAWLINGS, JR.

INVENTOR
LAWRENCE JAMES RAWLINGS, JR.

SWING-OUT AERATION APPARATUS WITH LOW-FLOW RESISTANCE

BACKGROUND OF THE INVENTION

The invention of which this disclosure is offered for public dissemination in the event that adequate patent protection is available relates to swing-out diffusion systems for the aeration of sewage and the like. In treating sewage by the activated sludge treatment, the sewage (after some solids are settled out) is passed through huge aeration tanks. In an aeration tank, air is supplied to a plurality of horizontal headers deep in the tank, each header having on it a number of devices, preferably spargers, for liberating air into the surrounding liquid. In some systems, the submerged horizontal headers are aligned parallel to the general direction of flow of liquor through the tank. In others, they are aligned perpendicular to, or on the bias with, the general direction of flow of liquor in the tank.

Various inventions have been made over many years relating to the raising of submerged headers from the liquid for servicing. Some of these required complex, and expensive winching arrangements. Generally speaking, the submerged headers have been raised by manipulation of the supply pipe or riser which extends downwardly from above the surface of the liquid to the header. The most popular type of removal arrangement has been the knee-action systems represented by U.S. Pat. No. 2,328,655, issued in 1943. These included two swivel joints, one at the top of the riser and the other about midway of its length. There have been various proposals for avoiding the two swivel joints but none has been entirely satisfactory in providing the swing-out function. One of the best nonswing systems is represented by Walker U.S. Pat. No. 3,339,901, but it has required disconnecting the riser pipe from the supply main. This has been quite suitable when economy was of considerable interest, but has not satisfied those who wanted the convenience of a swing-out arrangement. Another effort to avoid the two swivels has involved the use of flexible hose, but this also has its disadvantages.

There has therefore long remained a desire for improved swing-out facilities using rigid pipe. One reason has of course been economy, the two swivel joints of the knee-action type of device being quite expensive.

The present invention utilizes a very simple expedient of using a straight riser which has a relatively simple elbow-type swivel fitting at the top which permits the lifting of the assembly by swinging it, as a unit, in a plane parallel to and adjacent the service walk. In the usual situation in which such swinging might seem to be prevented by the closeness of the header to the tank floor, this simple swinging may be made possible by offsetting the center of the header from the point directly below the pivotal axis, the straight riser therefore sloping. Because of the offset, the arc of movement of the assembly does not carry the trailing end of the header down so as to strike the floor of the tank. The winching arrangements for handling of the huge and heavy structure can be much simpler and more convenient than heretofore. This is partly because there is no need to support this heavy structure in cantilever manner far out from the wall, as was characteristic of the knee-action construction.

An important advantage of this aspect of the invention is in reducing head loss. In the operation of a sewage treatment plant, one of the greatest costs is the compression of the tremendous quantities of air required. With lower head loss in the piping, lower pressure at the pump is required, and even though the same quantity of air is pumped and the release pressure is the same, less work is done. Hence the pump does less work, and money is saved. Sometimes a slight reduction in the required pump pressure will permit a more favorable choice of pumps. A pump may be chosen which is more favorable in one or more such considerations as cost, efficiency and freedom from maintenance. The complex swivel joints deemed necessary for the popular knee-action swing-out diffuser had very high-head loss, one of them being equivalent to more than 100 feet of pipe. The simple elbow-type swivels which can be used with the present swing-out arrangements have very low-head loss.

The present invention also lends itself to use with headers positioned on the bias. A preferred embodiment is so versatile that the operator will have the option of conveniently changing back and forth between the kind of operations known as (a) helical roll, (b) cross roll, and (c) complete mixing bias diffusion, and many variations of the three, should he so desire.

Moreover, recent developments have shown that the bias-diffusion system, in which more complete uniformity of tank contents is achieved, is superior to other systems. A preferred embodiment, described in detail herein, permits adjustment of the bias, or angle between liquor-roll axis and general direction of liquor flow, to permit actual inservice determination of the best angle for a particular through-put, etc.

DESIGNATION OF THE FIGURES

DESCRIPTION OF PREFERRED EMBODIMENT

Figure 1:
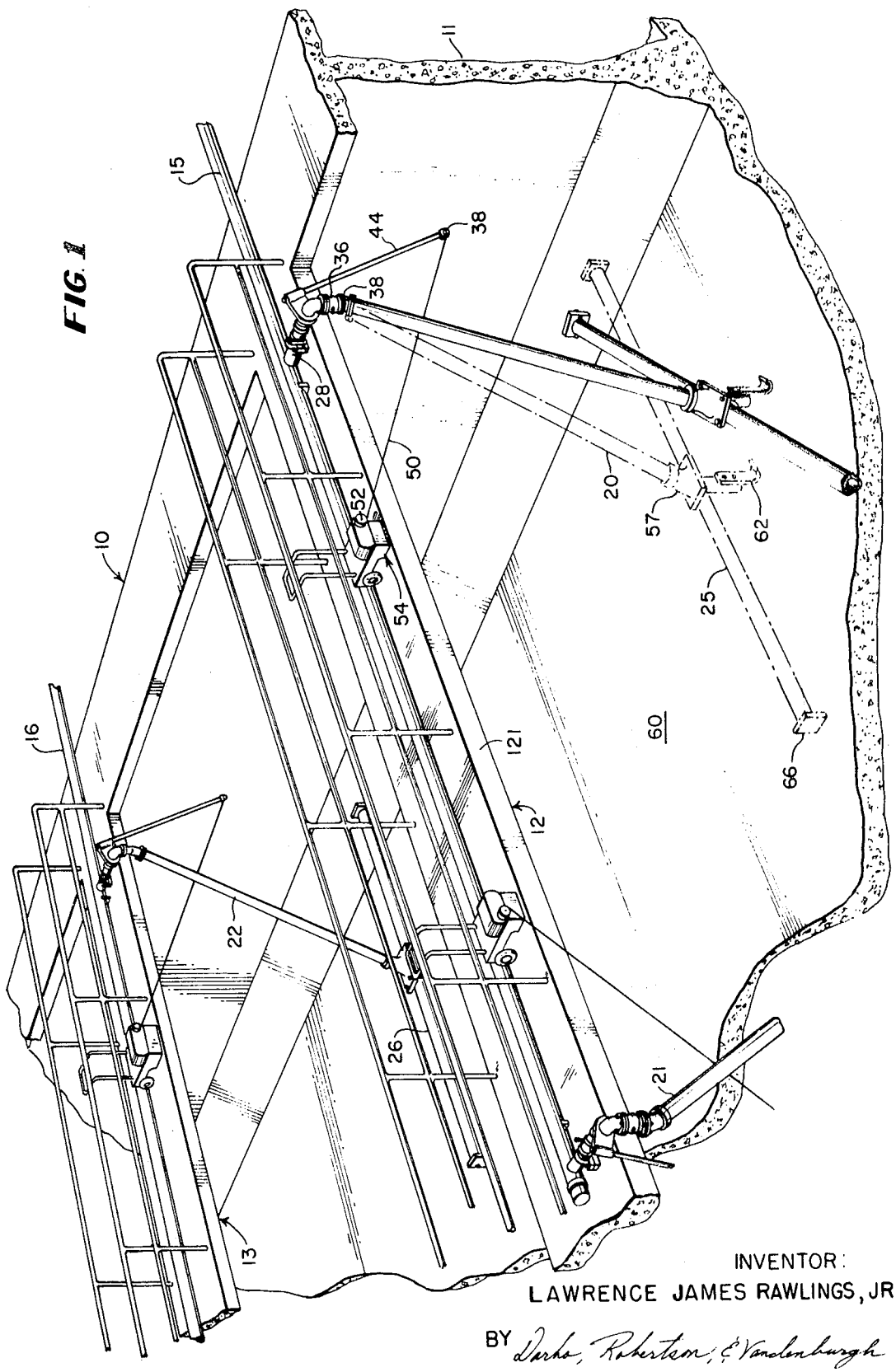
FIG. 1 is a fragmentary perspective view showing a portion of a sewage treatment plant equipped in accordance with this invention.

Although the following disclosure offered for public dissemination, in return for the grant of a patent, is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Illustrated in the attached drawings is a portion of a sewage treatment tank, generally 10, having a plurality of walls 11 and service walks, 12, 13. Sewage treatment tank 10 is equipped with air supply lines 15, 16, which supply large quantities of air to liquor (not shown for purpose of clarity) in tank 10 by way of risers 20, 21, 22 and horizontal, deeply submerged headers 25, 26.

In the illustrated embodiment, supply line 15 is pneumatically connected to riser 20 through a short conduit system including horizontal pipe 28, manually operable butterfly valve 30, a first pivot means 32, elbow 34, second pivot means generally 36 and bend 38. In the illustrated embodiment socket arm 40 is welded or otherwise fixed to the horizontal portion of 42 of elbow 34. Lever arm 44 seats in socket 46 of socket arm 40 and includes means 48 for fastening cable 50 to the free end thereof. Cable 50 is secured to the winch reel 52 of portable electric winch 54. Winch 54 is preferably blocked to prevent sliding, but need not be constructed to support weight far out.

Riser 20 is joined to horizontal header 25 by conventional inflexible attachment means 57 which maintains a fixed angle between riser 20 and header 25. Horizontal header 25 is supported spaced accurately above from floor 60 of tank 10 by means of foot means 62.

A plurality of spargers are pneumatically connected to header 25 for discharge of air into the liquor in tank 10, and header 25 is sealed at both ends by end plates 66.

Figure 6:
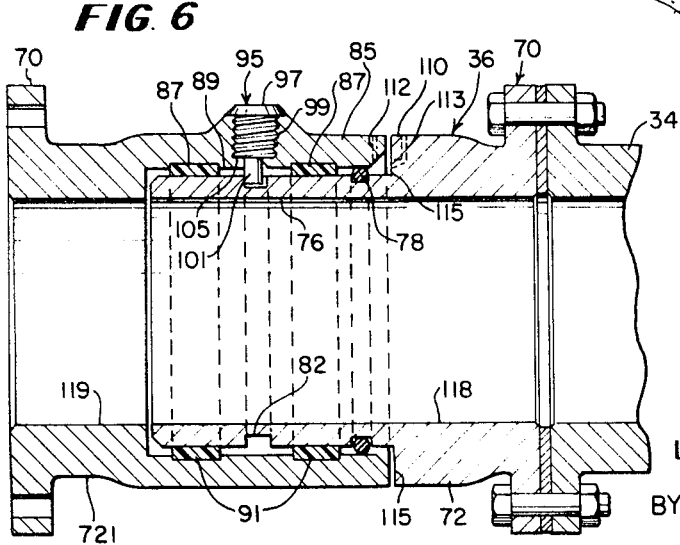
FIG. 6 is an enlarged cross-sectional fragmentary view taken approximately along the line 6—6 of FIG. 5.

Pivots 32 and 36 may be identical or constructed on the same principles and consequently only one of the pivots is described in the detailed enlargement shown in FIG. 6.

Pivot 36 is secured to elbow 34 and bend 38 by means of conventional gasketed, butting flange connection 70. In general terms this pivot includes a male element 72 and female element 74. Male element 72 includes elongated neck portion 76 having a first recess 78 around its outer circumference for seating of "O"-ring 79. A second outer circumferential recess 82, the purpose of which will be described in detail hereinafter, is also provided.

Female portion 74 of pivot 36 includes elongated sleeve or collar portion 85 proportioned to fit closely around elongated neck portion 76. In the illustrated embodiment elongated collar portion 85 includes a plurality of internal recesses 87 which extend completely around the inner face 89 of collar 85. Bearing means 91, e.g. durable low-friction strips of plastic such as Nylotron (T.M., Polymer Corp.) are seated in recesses 87.

Pin screw 95 includes an enlarged head 97, threaded shank 99 and end pin 101. Shoulder 103 of shank 99 butts or seats against shoulder 105. Pin 101 is dimensioned to pass relatively loosely into recess 82 which extends completely around the external circumference of neck 76. However pin 101 does not contact bottom of recess 82. Thus pin 101 serves to prevent withdrawal of portion 72 from portion 74, but does not hinder pivoting of one with respect to the other around their longitudinal pivotal axis.

Female portion 74 is secured to adjacent downstream piping by conventional means, e.g., flange joint 70.

Locking screw 110 is threaded into a threaded opening formed by threaded half-opening 112 in the terminal end of collar 85 and threaded half-opening 113 formed in shoulder 115 of male portion 72.

It is noted that inner wall 118 of male portion 72 is flush with the inner wall 119 of female portion 74. Thus the presence of the pivot causes no constriction or change of direction of the fluid flowing therethrough.

Hence, each pivot 32, 36 permits rotation of the respective male and female portions independently around the elongated axis of the pivot. It is further noted that horizontally disposed pivot 32 is not only positioned to provide a horizontal axis of rotation but moreover, that axis of rotation extends in a direction substantially perpendicular to the edge 121 of service walk 12. Pivot 36, on the other hand, has a substantially vertical axis of rotation, when header 25 is horizontal, having been lowered to its depth of use.

OPERATION

In the illustrated embodiment, in which both a horizontal pivot 32 and vertical pivot 36 are provided, the functions of the pivots combine to provide many advantages heretofore unavailable in similar equipment.

Figure 2:
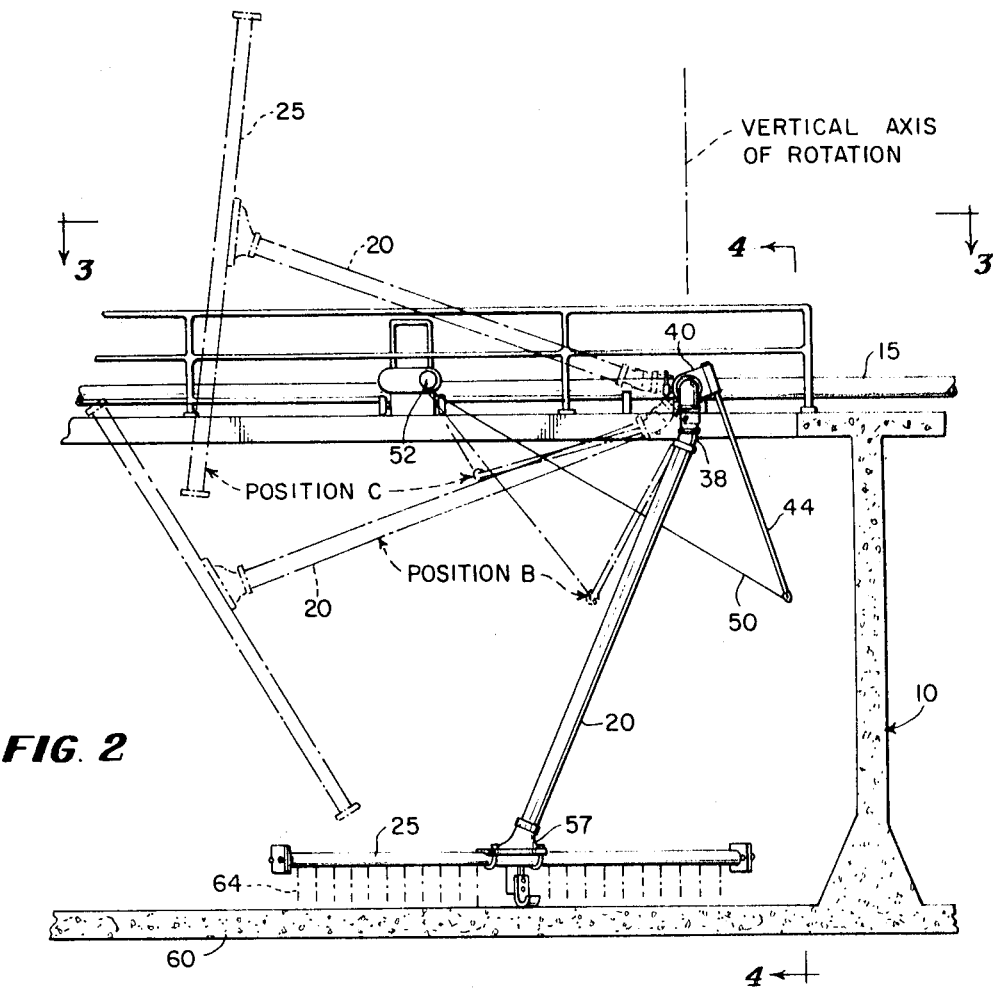
FIG. 2 is a fragmentary cross-sectional elevational view illustrating the improved swing-out header riser of this invention.

First of all the novel structure of this invention provides a swing-out function having a convenience and adjustability heretofore unavailable. Thus, as perhaps best appreciated from a consideration of FIG. 2, portable electric winch 54 is positioned on service walk 12 with reel 52 extending over edge 121. Rotation of reel 52 draws in line or cable 50 thus causing pivoting of lever arm 44. Illustrated in FIG. 2 are three of the many positions which can be achieved in the vertical plane adjacent the service walk, in accordance with this invention. These illustrate the swing-out action of the structure of this invention.

It is preferred that header 25 be in "position A" before swing-out is started. As cable 50 draws lever arm 44 to "position B" indicated in dash lines in FIG. 2, riser 20 is likewise pivoted in a vertical plane to "position B." Continued rotation of lever arm 44 to "position C" illustrated in FIG. 2 causes further vertical movement of riser 20 to "position C." It is noted that the on-off control of electric winch 54 permits stopping the elevation of header 25 at any point. Thus an operator standing on crosswalk 12 may stop the lifting of header 25 at any point and conveniently check and service spargers 64 which are then at a comfortable height.

Unwinding of cable 50 from winch reel 52 reverses the action, lowering header 25 back into the tank. Since header 25 is fixed with respect to vertical riser 20, and since vertical riser 20 is fixed with respect to bend 38, header 25 will always be horizontal, i.e., parallel to bottom 60 of tank, generally 10, when foot 62 supports it near the bottom. It is not essential that vertical axis pivot 36 be included, however, if it is, then header 25 will remain horizontal to the bottom regardless of the extent to which it is pivoted in its horizontal plane.

In the illustrated embodiment the length of foot support 62 is adjustable and is fixed at an appropriate length to support header 25 in a horizontal position, i.e., parallel to bottom 60. It is noted further that the axes of rotation of pivots 32 and 36 are perpendicular to each other. Thus, since axis of pivot 32 is oriented in substantially a horizontal plane, the axis of rotation of pivot 36 can be oriented in a substantially vertical plane. It is essential, in accordance with the preferred embodiment of this invention illustrated in the drawings attached hereto, that the dimensioning of riser 25 and the angularity of connection means 57 and bend 38, and length of foot support 62 be such that the axis of rotation of pivot means 36 is substantially vertical when header 25 is substantially horizontal. This being the case, therefore, header 25 can be pivoted through an extremely wide arc in a horizontal plane, and yet, at any angularity, remain horizontal.

It is preferred that the vertical axis pivot 36 include releasable locking means for maintaining a desired angularity.

Figure 3:
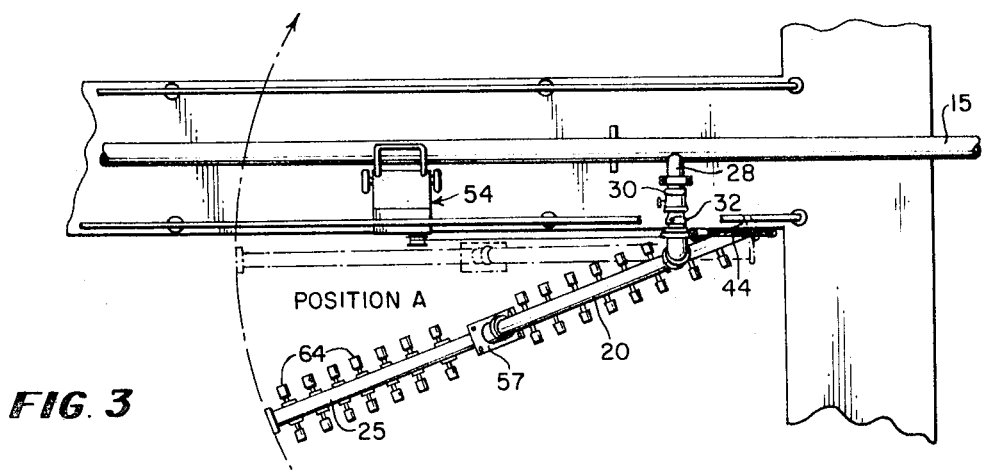
FIG. 3 is a fragmentary plan view taken approximately along the line 3—3 of FIG. 2.
Figure 4:
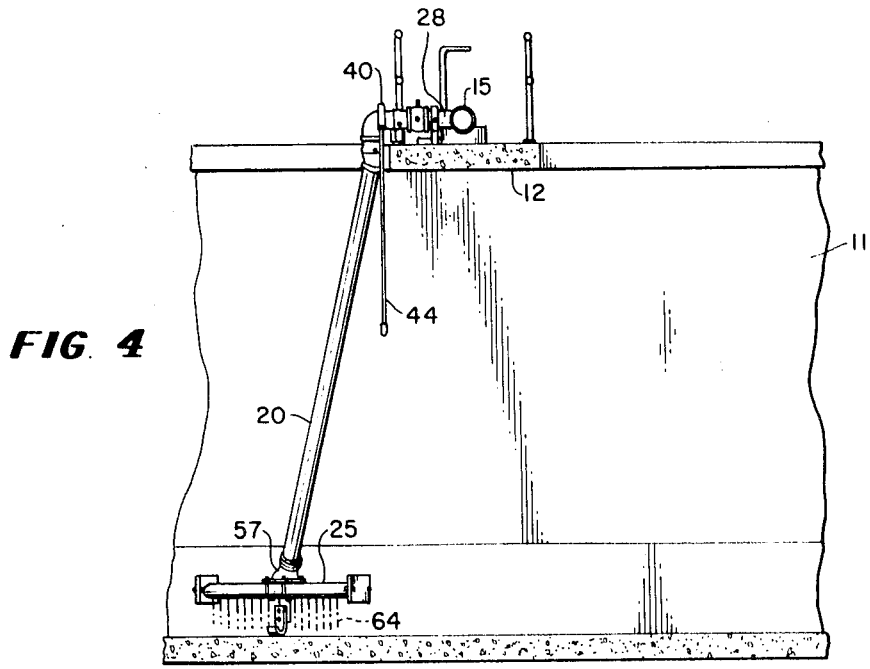
FIG. 4 is a fragmentary elevational cross-sectional view taken approximately along the line 4—4 of FIG. 3.
Figure 5:
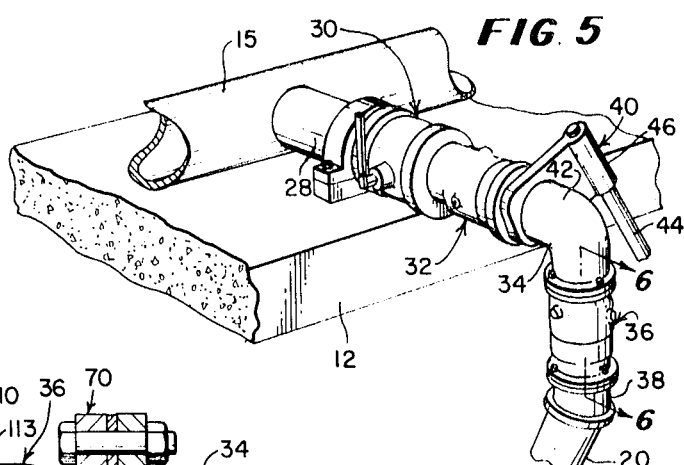
FIG. 5 is an enlarged fragmentary perspective view showing the details of the swivel feature in accordance with this invention.

Thus header 25 could pivot 360° around the vertical axis of rotation of pivot 36, if it were not for the close proximity of wall 11. Because of the ability to swing header 25 horizontally through a wide, operating arc as indicated on FIG. 3 of the attached drawings, header 25 can be positioned (a) at an acute angle to sidewall 11 (as illustrated by the solid lines of FIG. 3), (b) perpendicularly to sidewall 11 (as illustrated by "position A" in FIG. 3), or (c) parallel to sidewall 11.

Generally, influent liquor enters a tank at one end, and effluent leaves from the other end of the tank. The general direction between these ends is referred to herein as the general direction of flow of the liquor. When the general direction of flow of the liquor in the tank is parallel to sidewall 11, and header 25 is in "position A," in which header 25 is perpendicular wall 11, air rising from header 25 generates rolls having a longitudinal axis perpendicular to the general direction of flow. This kind of operation is generally referred to as "cross roll." Operation of headers oriented on the bias with the general direction of flow of liquor, e.g., the position shown in solid lines in FIG. 3, causes the development of rolls in the liquor which have a longitudinal axis on the bias with the general direction of the flow of the liquor. This kind of operation is a recent development sometimes referred to as a "complete mix bias diffusion" operation, and has been found to provide more complete intermixing of the various regions within the tank to thus generate a more nearly uniform liquor makeup throughout the tank. Operation of headers 25 when aligned parallel to and near one wall of a sewage treatment tank generates a large roll having a longitudinal axis parallel to the sidewall of the tank. This kind of operation is frequently referred to as "spiral flow" although "helical flow" would be more accurate. Should the operator desire to generate a helical flow in a tank having the configuration illustrated in FIG. 1, the operator would pivot risers 20, 22 until headers 25, 26 are aligned in a substantially straight line parallel to sidewall 11; and he would shut off the air valve supplying air to risers on the opposite side of the tank, e.g., to riser 21. Means for locking the header assembly are described hereinbefore.

Thus, in accordance with this invention, not only is the header-riser assembly more readily inspected and serviced, but moreover the invention provides a degree of flexibility heretofore unavailable. Moreover, the ease of service, and the flexibility of operation, is achieved in spite of an utter simplicity and economy of materials, and with no requirement of cumbersome hoisting mechanism.

I claim:
1. In a sewage treatment tank having a plurality of air injection means fixed along an air injection header the header, being substantially parallel to the bottom of the tank, the header being supplied by a riser extending upwardly through the liquor in the tank to an air supply line, said sewage treatment tank having a service-walkway disposed above the surface of the liquor in the tank, said walkway having an edge thereof, the improvement comprising:

conduit means for connecting the air supply means to the riser, said conduit means including a first pivot means for pivoting the riser in a vertical plane, said vertical plane being substantially parallel to the edge of the service walkway, said pivot means having an axis of rotation which is horizontal, and in a line which extends in a direction substantially perpendicular to the edge of the walkway;

said conduit means also including second pivot means for pivoting said header in a horizontal plane around a substantially vertical axis, said pivot means having an axis of rotation which is substantially vertical when the header is horizontal, and including means for releasably locking said second pivot means.

2. Swing-out aeration equipment for use in a deep large treatment tank having a service walk positioned for supporting and servicing said equipment and provided with a fixed air supply fitting having its outflow axis extending out from said walk and over said tank, the aeration equipment including a header to be deeply submerged in said tank and horizontally disposed, and piping for supplying air to the header from said fitting and for raising the header to adjacency with the service walk for servicing, characterized in that:

said piping includes a rigid riser rigidly associated with the header, an elbow communicating with the upper end of the riser and normally rigid with it, and a swing-out swivel including male and female members, one of which is rigid with said elbow and the other of which is adapted to be secured to said fitting, said swivel swiveling about said axis and the passage to the swivel being substantially that of an open pipe, the riser communicating with the header at an intermediate point and extending therefrom at an angle less than 90° to offset the midpoint of the header from the vertical plane of said axis when the header is horizontal, and means for limiting the downward swing of the riser to the point at which the header is horizontal.

3. Swing-out aeration equipment for use in a deep large treatment tank having service walk positioned for supporting and servicing said equipment and provided with a fixed air supply fitting having its outflow axis extending out from said walk and over said tank the aeration equipment including a header to be deeply submerged in said tank and horizontally disposed, and piping for supplying air to the header from said fitting and for raising the header to adjacency with the service walk for servicing, characterized in that:

said piping includes a rigid riser rigidly associated with the header, an elbow communicating with the upper end of the riser and normally rigid with it, and a swing-out swivel including male and female members, one of which is rigid with said elbow and the other of which is adapted to be secured to said fitting, said swivel swiveling about said axis and the passage to the swivel being substantially that of an open pipe, said piping including a swivel of like nature between the elbow and the riser, swiveling about an axis which is substantially vertical when the header has been swung down to its horizontal position, for swinging the header into parallelism with said service walk prior to swinging it out, and means for locking said vertical axis swivel against swiveling to hold the lowered horizontal header at a chosen angularity.

* * * * *